June 4, 1968   G. G. GODA ET AL   3,386,470
LIQUID CHECK VALVE ASSEMBLY
Filed March 9, 1966
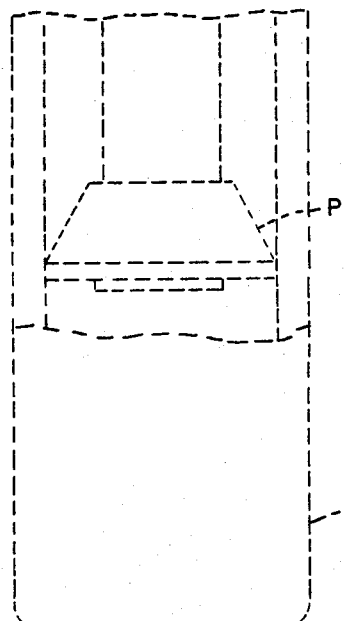
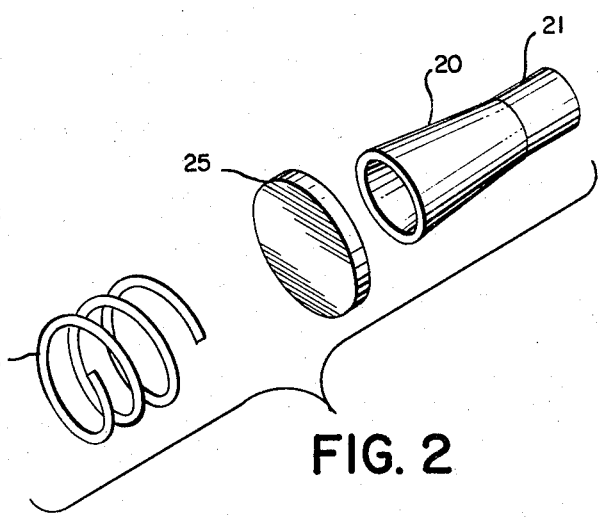
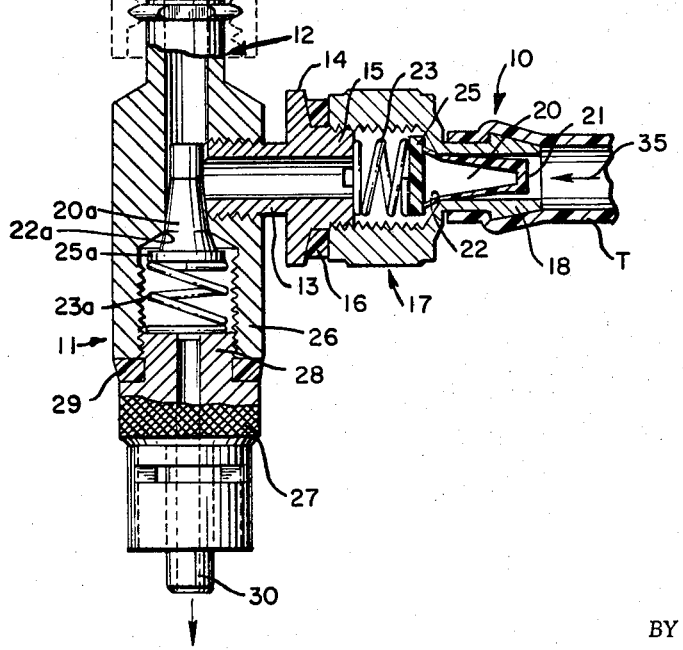
INVENTORS
GEORGE G. GODA
ROY CONIGLIONE
BY
S. Stephen Baker
ATTORNEY

United States Patent Office 3,386,470
Patented June 4, 1968

3,386,470
LIQUID CHECK VALVE ASSEMBLY
George G. Goda, New York, and Roy Coniglione, Maspeth, N.Y., assignors to Greiner Scientific Corporation, New York, N.Y., a corporation of New York
Filed Mar. 9, 1966, Ser. No. 532,904
3 Claims. (Cl. 137—512)

This invention relates to liquid check valves and more particularly to a liquid dispensing device usually used in connection with a plunger actuated liquid pumping member such as a syringe or the like, and arranged to deliver a measured quantity of liquid from a larger supply thereof. Devices of this type are used principally in scientific and industrial laboratories or in other circumstances where a measured volume of liquid is to be dispensed.

The check valve of this invention is particularly devised to competently handle corrosive liquids such as various acids or indeed almost any harsh corrosive liquid chemical. Thus the valve itself is of the piston type and is preferably formed of Teflon (trademark of Du Pont for polyfluorocarbon), which is sufficiently inert to serve the purpose. Although this characteristic is of course well known, a long standing problem has been the difficulty in utilizing the hard Teflon material as to render it serviceable in a piston type valve which requires physical deformation of some kind in adapting itself to a valve seat. We have solved this problem as hereinafter set forth.

The invention will be further understood from the following description and drawings in which:

FIGURE 1 is an elevational view, showing substantially the complete assembly; and FIGURE 2 is an exploded perspective view of the valve parts.

The assembly comprises an intake section 10 and a discharge or dispensing section 11, as well as a pump or reservoir connecting section 12. Intake section 10 comprises the intake tube 13 and enlarged integral flange 14 from which extends externally threaded hollow post 15. Seated against flange 14 is a ring shaped sealing gasket 16 which is preferably of an inert plastic such as Teflon.

Screwed on post 15 is the hollow knurled valve housing 17 on which is integrally formed the reduced hollow intake tip 18. The extreme outer end of tip 18 is slightly enlarged so as to permit the conventional connection thereto of a resilient plastic tube T which may be conveniently dipped or otherwise effectively connected to a container or other source of liquid. Tube 13, housing 17 and tip 18 form a liquid conduit.

One section of our improved check valve system is disposed within the conduit of housing 17, including tip 18. Thus an elongated cone shaped valve 20 is slidably disposed in the intake section. Valve 20, as an example, may have a length of 5/16". Its disc-like base 21 is thickened, while its conical wall flares outwardly and is very thin, being of a thickness of about .010". In the example described, its mouth diameter was 3/16" while its base diameter was .100". It is preferably formed of an inert plastic or firm polymer such as the polyfluorocarbon Teflon, although other firm polymers may be used (nylon, polyethylene, etc., if resistant to the liquid being handled). Accordingly, its mouth section is flexible, is made as smooth as possible on its outer surface, and thus effects a tight fitting relationship with the concave valve seat 22.

Coacting with valve 20 is the short metal helical spring 23 and the floating disc 25 which is of Teflon. Disc 25 is of a diameter slightly greater than that of the mouth section of valve 20. Disc 25 is not deformable, being of a thickness of about .100". Its function is to serve as an abutment or seat for valve spring 23. However, as will be explained hereinafter, in larger capacity systems, a spring 23 and its disc seat 25 may be eliminated in the intake section 10.

The dispensing section 11 has an oppositely or alternately acting check valve system which substantially duplicates the intake arrangement. Thus it comprises the conduit forming valve housing 26 which is hollow and tubular, and includes the concave valve seat 22a. Slidably disposed therein is the valve 20a which is a duplicate of valve 20. Disc 25a likewise duplicates disc 25. A short helical valve spring 23a is included in the dispensing section as hereinafter described.

Connected downwardly from tubular housing 26 is a more or less conventional discharge or dispensing knurled tip 27. Thus tip 27 has a threaded neck 28 which is screwed into the internally threaded outer end of housing 26, a Teflon gasket 29 being employed. Spring 23a is seated against neck 28. Tip outer section 30 is the conventional Luer lock type which engages a conventional hypodermic needle or other cannula.

Our invention operates as follows:

A suitable pump usually in the form of a syringe, is connected to pump end 12, such pump end being illustrated as of the Luer lock type so that a conventional hypodermic syringe S serving as a liquid reservoir device may be connected thereto as indicated in dotted lines. However, it is highly desirable that an automatically metering type of syringe pump be employed as illustrated in prior co-pending application of George Goda, Ser. No. 428,437, now Patent No. 3,327,900 and in the subsequent joint application filed by the same inventors as herein, on liquid dispensing devices.

The syringe S barrel or reservoir includes the usual piston P which reciprocates therein. As a result, when tube T is immersed into a container of the liquid to be dispensed, the liquid will flow in the direction of arrow 35, thereby forcing valve 20 inwardly (against the action of spring 23 when provided), and filling the syringe barrel. It will be understood, of course, that the same force causes the mouth section of valve 20a to close against its seat so as to prevent discharge of the liquid while the barrel is being filled.

On the discharge or dispensing stroke, the valve 20a is forced downwardly against the action of spring 23a and the liquid is dispensed. Spring 23 seats against disc 25 and more positively closes intake valve 20. However, when the syringe exceeds about 10 cc. in capacity, the pressure itself will close valve 20 making the intake valve spring 23 unnecessary. Of course, under these conditions, the intake valve disc 25 is also unnecessary. However, the dispensing section should always have spring assistance to assure proper closing when the barrel is being filled. It may further be observed that whereas the valve housings and valve seats are shown herein as being formed of metal, i.e., brass, it is also advantageous to form them of Teflon, and indeed the entire assembly may be so formed.

Our improved liquid check valve system produces precision liquid pumping and transferring even in the presence of corrosive liquids of most types. The very thin walled, conical valves 20–20a are resilient and their mouth sections deform as required to effect precise closure, assisted when necessary by the valve springs and disc seats as above explained.

We have shown a preferred embodiment of our invention, but it is obvious that numerous changes and omissions may be made without departing from its spirit.

What is claimed is:

1. In a liquid pumping system, a check valve assembly comprising a valve housing formed with a liquid conduit and a valve seat, and an elongated valve slidably disposed in said conduit, said valve being of hollow conical shape and having an enlarged mouth portion adapted to close against said valve seat, and wherein said valve is substantially formed of thinwalled, chemically inert plastic material, the wall thereof including said mouth portion being resilient and deformable, and a relatively rigid disc-like annular base for said valve wall, and including a floating disc in said conduit normally adjacent to the mouth of said valve and of a diameter at least that of said mouth, and a valve spring in said conduit and bearing against said floating disc so as to apply valve closing pressure to said valve.

2. A check valve assembly according to claim 1 and including a second valve housing in said assembly, said second valve housing likewise being formed with a liquid conduit and a valve seat, and a second elongated valve slidably disposed therein, said second valve duplicating the structure of said first-mentioned valve, both of said valves being arranged to act in opposition to said other, one of said valve housings functioning as an intake section while the other housing functions as a dispensing section, said sections communicating with each other, and means for connecting both of said housing conduits to a reservoir device whereby liquid may be transferred from said intake section to said reservoir device and thereafter discharged therefrom and through said dispensing section.

3. A check valve assembly according to claim 2 and wherein both said elongated valves are formed of polyfluorocarbon.

References Cited

UNITED STATES PATENTS

| | | | |
|---|---|---|---|
| 2,976,010 | 3/1961 | Hothsing | 251—333 |
| 3,058,486 | 10/1962 | McDermont | 137—515.5 |
| 3,291,066 | 12/1966 | Cordis | 137—512 XR |
| 3,356,103 | 12/1967 | Biello | 137—515.5 |

WILLIAM F. O'DEA, *Primary Examiner.*

W. H. WRIGHT, *Assistant Examiner.*